United States Patent
Kim et al.

(10) Patent No.: US 7,402,650 B2
(45) Date of Patent: Jul. 22, 2008

(54) PROCESS FOR PREPARING POLYARYLATE HAVING HIGH THERMO-RESISTANCE AND HIGH TRANSPARENCY

(75) Inventors: Hee-jung Kim, Daejeon (KR);
Dong-ryul Kim, Daejeon (KR);
Sang-uk Ryu, Daejeon (KR);
Sang-hyun Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 170 days.

(21) Appl. No.: 11/225,885

(22) Filed: Sep. 14, 2005

(65) Prior Publication Data
US 2006/0058495 A1     Mar. 16, 2006

(30) Foreign Application Priority Data
Sep. 15, 2004     (KR) ................ 10-2004-0073870

(51) Int. Cl.
*C08G 63/02*     (2006.01)
(52) U.S. Cl. .............. 528/179; 528/176; 528/190; 528/191; 528/196; 528/198; 528/271; 528/272
(58) Field of Classification Search ............ 525/425; 528/176, 179, 190, 191, 196, 198, 271, 272
See application file for complete search history.

(56) References Cited

U.S. PATENT DOCUMENTS 4,992,526 A    2/1991 Wang 6,753,363 B1 *    6/2004    Harashina ............... 524/99
6,831,112 B2 *    12/2004    Kaku et al. ............. 521/174

FOREIGN PATENT DOCUMENTS

JP     5-43670     2/1993

* cited by examiner

*Primary Examiner*—Terressa Boykin
(74) *Attorney, Agent, or Firm*—McKenna Long & Aldridge LLP

(57) ABSTRACT

A process for preparing polyarylate wherein a bivalent phenol compound having the structure of Formula 1 and an aromatic dicarboxylic acid halogen compound react to prepare a polyarylate, and wherein a nonionic surface-active agent is added. This decreases residual salts and improves the transmittance and the heat-resistance. In Formula 1, R1, R2, R3 and R4 denote the same as illustrated in the description.

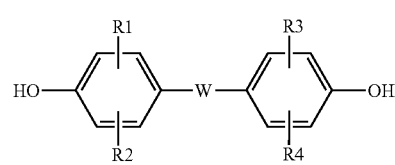

<Formula 1>

5 Claims, No Drawings

PROCESS FOR PREPARING POLYARYLATE HAVING HIGH THERMO-RESISTANCE AND HIGH TRANSPARENCY

This application claims the benefit of the filing date of Korean Patent Application No. 10-2004-0073870 filed on Sep. 15, 2004 in the Korean Intellectual Property Office, the disclosure of which is incorporated herein in its entirety by reference.

TECHNICAL FIELD

The present invention relates to a process for preparing polyarylate having a high thermo-resistance and a high transparency with a low residual salt, more particularly to a process for preparing polyarylate wherein a bivalent phenol compound having the structure of Formula 1 and an aromatic dicarboxylic acid halogen compound are reacted by a interfacial polymerization to prepare a polyarylate, characterized in that a nonionic surface-active agent is added.

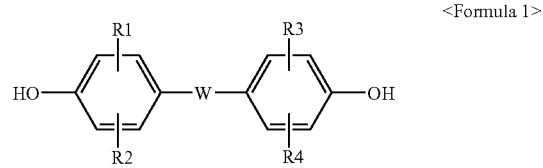

<Formula 1>

In the above Formula 1, R1, R2, R3 and R4 denote the same as described above.

BACKGROUND ART

Polyarylate refers to a linear polyester resin belonging to the aromatic group and is prepared by poly-condensing an aromatic diol and an aromatic dicarboxylic acid.

Such a polyarylate resin can have several molecular formulas, depending upon the source material. Polyarylate resin comprising structural units of Formula 2 described below that is reacted with bisphenol A as a bivalent phenol and terephthalic acid or isophthalic acid as a dicarboxylic acid by a polycondensation is an exemplary product.

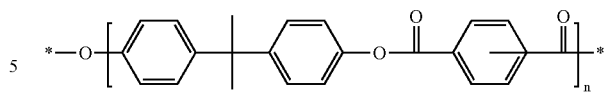

<Formula 2>

Recently, certain bivalent phenol compounds having a bulky substitute group are sometimes utilized to raise a transition temperature of separation (Tg). For example, the compound having the structure of Formula 3 can be adopted.

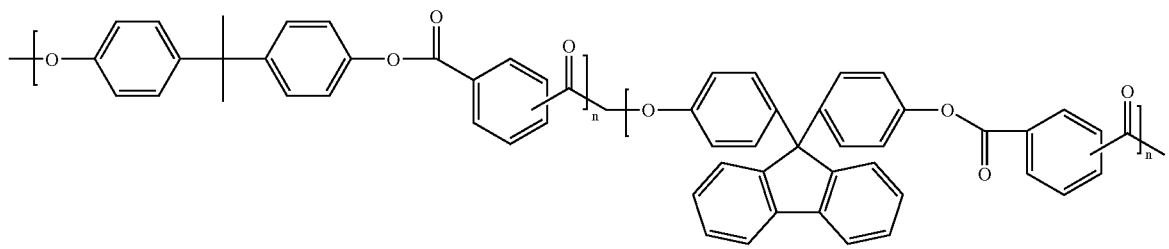

<Formula 3>

The polyarylate resin of Formula 2 is known in the art as an engineering plastic. In practice, the polyarylate can be widely used in the field of electric and electronic appliance part: for a switch, a socket, parts of a microwave, a relay case and a plate since the polymer. In mechanical products, it can be widely used as material or a packaging matter to prepare various products, such as inner or and outer parts of watch, parts of optical machine, parts of heating device including a contact breaker of gas, lenses for a housing or an automobile, overall housing products and instrument boards.

In reference, the method for preparing polyarylate resin, wherein n-butylbenzyl ammonium chloride is used as a cationic catalyst to prepare high molecular weight in the interfacial polymerization, has been disclosed in Japanese Patent Laid-open No. 43670/1993. However, the polyarylate prepared above is liable to leave catalysts and salts in the organic phase of polymer solution after finishing the interfacial polymerization, because of a high lipophilic property of the catalyst. The resulting polyarylate resin may include a lot of residual catalysts and salts so as to reduce the physical property of polyarylate.

Also, the method for preparing 1,6-diaza[4,4]spirolactam compounds substituted by hydroxyaryl, has been demonstrated in U.S. Pat. No. 4,992,526. In this technique, the copolymer reacting an aromatic dicarboxylic acid halogen compound and a spirolactam compound substituted for hydroxyaryl and/or the tripolymer further added by a bivalent phenol compound, are prepared by using a cationic catalyst for the phase transition. This invention aims to provide a process for preparing a spirolactam compound, as expressed in the title. Within the scope of the invention, an aromatic dicarboxylic acid halogen compound and a bivalent phenol compound are included, focusing on the spirolactam compound. However, there are several disadvantages as follows. In technical aspects, the cationic catalyst for the phase transition increases Haze of film, if remained in the final resin (typically, 0.5% of Haze increases, if 0.5 wt % of catalyst remains); reduces the thermo-stability of polymer; needs to increase the frequency of cleaning; and the like. Even in economical aspects, the catalyst should be beyond a predetermined amount to synthesize a high molecular weight product as well as is very expensive.

DISCLOSURE OF INVENTION

In order to settle foregoing problems, the present inventors have tried to investigate and found out that various polyarylates having a broad range of molecular weight can be polymerized by using a nonionic surface-active agent and improve the transparency and the heat-resistance and leave a smaller amount of residual salts within polymer products. Therefore, the present invention is completed successfully.

The present invention related to a process for preparing polyarylate, by reacting a bivalent phenol monomer and an aromatic dicarboxylic acid halogen compound through a surface-active polymerization, wherein a nonionic detergent is added.

Preferably, the present invention provides a process for preparing polyarylate, wherein an alkaline solution of bivalent phenol compound and a solution of aromatic dicarboxylic acid halogen compound are reacted by the interfacial polymerization, characterized in that the nonionic surface-active agent having 4~20 of HLB value is added in 0.05~20 part per 100 part of phenol compound.

The process for preparation of the present invention described above enables to maximize the surface area for an interfacial polymerization as well as to decrease residual salts and improve the transparency, compared to conventional processes adding a cationic catalyst for the phase transition.

Additional advantages, objects and features of the present invention will be set forth in part in the description which follows and in part will become apparent to those having ordinary skill in the art upon examination of the following or may be learned from practice of the invention.

It is natural that other objects and advantages of the invention may be realized and attained by the structure particularly pointed out in the written description and claims hereof.

Hereinafter, the present invention will be described more clearly as follows.

In the process for preparing polyarylate of the present invention, the bivalent phenol compound can be irrespective of its kind, and preferably, at least one selected from compounds having the structure of Formula 1.

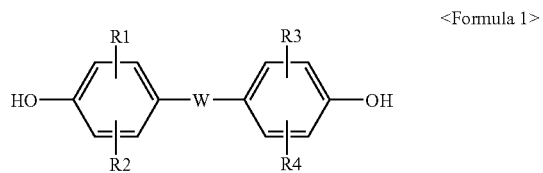

<Formula 1>

In the above Formula 1, R1, R2, R3 and R4 are hydrogen, $C_1$~$C_{12}$alkyl, aryl or halogen independently; W is $C_1$~$C_{30}$ alkylidene, $C_2$~$C_{30}$ alkylene, $C_3$~$C_{30}$ cycloalkylidene, $C_3$~$C_{30}$ cycloalkene, $C_2$~$C_{30}$ alkylene substituted for phenyl, oxygen, sulfur, sulfoxide, sulfone or single bond.

More preferably, the bivalent phenol compound can be at least one bis(4-hydroxyaryl)alkane selected from the group comprising bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-2,5-dibromophenyl)propane, bis(4-hydroxyphenyl)phenylmethane, 4,4-dihydroxyphenyl-1,1-m-diisopropylbenzene and 4,4-dihydroxyphenyl-9,9-fluorene; at least one bis(hydroxyaryl)cycloalkane selected from the group comprising 1,1-bis(4,4-dihydroxyphenyl)cyclopentane, 1,1-bis(4,4-dihydroxyphenyl)cyclohexane, 1-methyl-1(4-hydroxyphenyl)-4-(dimethyl-4-hydroxyphenyl)methylcyclohexane, 4-{1-[3-(4-hydroxyphenyl)-4-methylcyclohexyl]-1-methylethyl}phenol, 4,4-[1-methyl-4-(1-methylethyl)-1,3-cyclohexanediyl]bisphenol and 2,2,2,2-tetrahydro-3,3,3,3-tetramethyl-1,1-spirobis-[1H]-ynedene]-6,6-diol; at least one dihydroxydiarylether selected among bis(4-hydroxyphenyl)ether, bis(4-hydroxy-3,5-dichlorophenyl)ether and 4,4-dihydroxy-3,3-dimethylphenylether; at least one dihydroxydiarylsulfide selected from 4,4-dihydroxydiphenylsulfide and 4,4-dihydoxy-3,3-dimethyldiphenylsulfide; at least one dihydroxydiarylsulfoxide selected from 4,4-dihydroxydiphenylsulfoxide and 4,4-dihydroxy-3,3-dimethyldiphenylsulfoxide; at least one dihydroxydiarylsulfone selected from 4,4-dihydroxydiphenylsulfone and 4,4-dihydroxy-3,3-dimethyldiphenylsulfone; at least one dihydroxydiarylisatine selected from 4,4-dihydroxydiphenyl-3,3-isatine and the like; at least one dihydroxybenzene selected from the group comprising resocine, 3-methylresocine, 3-ethylresocine, 3-butylresocine, 3-t-butylresocine, 3-phenylresocine and 3-cumylresocine; at least one dihydroxydiphenyl selected from 4,4'-dihydroxydiphenyl and 3,3'-dichloro-4,4'-dihydroxydiphenyl; and their mixture of more than two selected above.

The aromatic dicarboxylic acid the bivalent phenol compound can be irrespective of its kind and preferably, at least one selected from the group comprising terephthalic acid, isophthalic acid, dibenzo acid, naphthalene dicarboxylic acid, bis(4-carboxyphenyl)methane, 1,2-bis(4-carboxyphenyl)ethane, 2,2-bis(4-carboxyphenyl)propane, bis(4-carboxyphenyl)oxide, bis(4-carboxyphenyl)sulfide, bis(4-carboxyphenyl)sulfone and other aromatic dicarboxylic acids substituted for the aromatic group of above compounds by $C_1$~$C_2$ alkyl or halogen, and their mixture. Preferably, the mixture can be comprised of 10~90 mol % of terephthalic acid halide and 90~10 mol % of isophthalic acid halide.

Preferably, the nonionic surface-active agent can have 4~20 of HLB value and more preferably, can be at least one selected from the group comprising polyoxy ethylene lauryl ether, polyoxyethylene nonylphenyl ether, octylphenoxy polyethoxy ethanol, polyoxyethylene-polyoxypropylene block copolymer, sorbitol anhydride, ethoxylated fatty acid alcohol, ethoxylated fatty acid, ethoxylated alkyl phenol, alkanolamide (fatty acid alkanolamide), ethoxylated fatty acid alkanolamide, fatty acid amine oxide, fatty acid amido amine oxide, glyceryl fatty acid ester, sorbitan, polyoxyethylene sorbitan tristearate, ethoxylated sorbitan ester, alkyl polyglycoside, ethylene/propylene oxide block copolymer, and ethoxylated-propoxylated fatty acid alcohol, but not limited within the kinds.

Preferably, the nonionic surface-active agent can be added before performing a polymerization or coincidently while adding the bivalent phenol compound into an alkaline solution. Preferably, the nonionic surface-active agent can be added in 0.05~20 part per 100 part of phenol compound.

If the nonionic surface-active agent is added in below 0.05 wt %, the reaction rate becomes slower during the polymerization. In contrast, if the nonionic detergent is added above 20 wt %, low molecular weight polyarylates are produced disadvantageously and badly affects the transparency of film, in spite of the purification.

HLB (hydrophilic lipophilic balance) denotes the ratio of lipophilic groups and hydrophilic groups in the surface-active agent. HLB value of the nonionic surface-active agent can be a coefficient indicating the weight percent ratio (wt %) of the hydrophilic group.

HLB value of the nonionic surface-active agent can be estimated as follows.

For a multivalent alcohol ester, HLB is calculated according to the Formula described below:

$$HLB=20\{1-(S/A)\}$$

Wherein, A is an acid value of fatty acids; and S is a saponification number in esters.

For an ethylene oxide additive (Tween system) of multivalent alcohol ester, HLB is calculated according to the Formula described below:

$$HLB=(E+P)/5$$

Wherein, E is the weight percent of ethylene oxide; and P is the weight percent of multivalent alcohol).

For an ethylene oxide additive, HLB is calculated according to the Formula described below:

$$HLB=E/5$$

Wherein, E is the weight percent of ethylene oxide (Reference: Surfactants and interfacial phenomena, MILTON J. ROSEN, 1989. p328).

In addition, a monofuctional phenol compound can be utilized to control the molecular weight of polymer in the process for preparing polyarylate of the present invention. More preferably, the monofuctional phenol compound can be selected from the group comprising phenol, o-, m-, p-cresol, o-, m-, p-ethyl phenol, o-, m-, p-propyl phenol and o-, m-, p-tert-butyl phenol; a monovalent alcohol compound selected from the group comprising methanol, ethanol, n-propanol, isopropanol, n-butanol, pentanol, hexanol, dodecyl alcohol, stearyl alcohol, benzyl alcohol and penethyl alcohol; and a mono functional (aromatic) carboxylic acid halide selected among benzyl chloride, methane sulfonyl chloride and phenylchloro formate; further, selected from the group comprising acetic acid, propionic acid, octanoic acid, cyclohexane carboxylic acid, benzoic acid, toluyl acid, phenylic acid, p-tert-butylbenzoic acid, p-methoxyphenyl acetic acid and the like.

Preferably, the alkali material used in the process for preparing polyarylate of the present invention can be at least one hydroxide of alkali metal selected from sodium hydroxide and potassium hydroxide. Preferably, the alkali material is used in 1.01~2 fold moles of phenolic hydroxides that are included in a bivalent and monovalent phenol. If the usage is below 1.01 fold, the bivalent phenol compound cannot dissolve completely. In contrast, if the usage is above 2.5 fold, the phase separation becomes worse or the resulting polymer may leave alkali compounds behind even after purifying polymer products and impair the quality of polyarylates especially in the transparency. Furthermore, the alkali material is preferable in 1.01~2 fold moles of phenolic hydroxides, since the aromatic dicarboxylic acid halide is hydrolyzed during the polymerization.

Preferably, the organic solvent used in the polymerization can be a solvent that can dissolve polyarylates and not react with water and more preferably, can be one selected from the group comprising methylene chloride, 1,2-dichloroethane, chloroform, carbon tetrachloride, chlorobenzene and 1,1,2,2-tetrachloroethane; or their mixture.

Preferably, the polymerization is performed at 0~40° C. and more preferably, at 0~30° C., since the hydrolysis of acid chloride is suppressed. In the procedure described above, after finishing the polymerization, the reactants stops to be stirred and washed by using distilled water to prepare polyarylate.

Next, the polyarylate film of the present invention can be obtained by solution casting onto a glass plate. The resulting polyarylate film is examined with a UV-Visible spectrometer (product from Varian Co. Ltd.) to measure the transmittance.

Finally, the polyarylate prepared in the present invention is analyzed to estimate the content of residual salts with ICP-AES (Inductively Coupled Plasma-Atomic Emission Spectrometer). In detail, 0.1 g of specimen is mixed with 1.5 ml of sulfuric acid, heated and carbonated. After that, nitric acid and hydrogen peroxide are added, heated to decompose organic material included in the resultant, then diluted to reach the final volume, 5 ml and analyzed.

BEST MODE FOR CARRYING OUT THE INVENTION

Practical and presently preferred embodiments of the present invention are illustrated as shown in the following Examples.

However, it will be appreciated that those skilled in the art, on consideration of this disclosure, may make modifications and improvements within the spirit and scope of the present invention.

EXAMPLE 1

6.962 g of 2,2-bis (4-hydroxyphenyl) propane, 0.038 g of phenol, 62 g of distilled water and 2.57 g of NaOH were added in a reactor installed with a stirrer and dissolve the monomers. Then, after the reactor was set up at 20° C., 1.2 g of EMULGEN 120® (structure: polyoxyethylene lauryl ether, HLB: 15.3) 5 wt % solution and 6.2 g of methylene chloride were added and stirred. Separately, 6.22 g of equal quantity of isophthalic acid chloride and terephthalic acid chloride was dissolved in 55 g of methylene chloride. The resulting solution was added to the alkaline solution prepared previously. After proceeding the polymerization for 2 hours, the reaction was stopped by adding acetic acid and then, washed out five times by using one-fold volume of methylene chloride and two-fold volume of distilled water. The resulting organic phase was washed repeatedly until the electric conductivity reached less than 50 μs/cm and poured into methanol to precipitate polymers.

EXAMPLE 2~5

The amounts of EMULGEN 120® 5 wt % solution were adjusted as illustrated in Table 1. The same procedure was performed as described in Example 1. The experimental results of Example 1~5 are summarized in Table 1.

TABLE 1

| Examples | Amount of nonionic detergent (per 100 wt % of bivalent phenol compound) | MW (×10$^3$) | MN (×10$^3$) | Tg (° C.) | Residual Na (ppm) | Degree of light transparency (%) |
|---|---|---|---|---|---|---|
| Example 1 | 0.3 | 200 | 106 | 212 | 2 | 92 |
| Example 2 | 0.6 | 177 | 99 | 213 | 3 | 91 |
| Example 3 | 1.6 | 140 | 86 | 211 | 6 | 92 |
| Example 4 | 3.15 | 87 | 51 | 204 | 5 | 90.5 |
| Example 5 | 6.3 | 156 | 85 | 204 | 6 | 92 |

EXAMPLE 6~10

The amounts of EMULGEN 123P® (structure: polyoxyethylene lauryl ether, HLB: 16.9) 5 wt % solution were adjusted, instead of EMULGEN 120®. The same procedure was performed to prepare polyarylate as described in Example 1. The experimental results are summarized in Table 2.

TABLE 2

| Examples | Amount of nonionic detergent (per 100 wt % of bivalent phenol compound) | MW (×10$^3$) | MN (×10$^3$) | Tg (° C.) | Residual Na (ppm) | Degree of light transparency (%) |
|---|---|---|---|---|---|---|
| Example 6 | 0.3 | 129 | 56 | 210 | 4 | 92 |
| Example 7 | 0.63 | 164 | 89 | 211 | 5 | 90 |
| Example 8 | 1.6 | 113 | 65 | 202 | 6 | 91 |
| Example 9 | 3.15 | 25 | 13 | 165 | 4 | 91.2 |
| Example 10 | 6.3 | 27 | 15 | 164 | 12 | 90.5 |

EXAMPLES 11~15

The amounts of RHEODOL TW-S320® (structure: polyoxyethylene sorbitan tristearate, HLB: 10.5) 5 wt % solution were adjusted as depicted in Table 3, instead of EMULGEN 120®. The same procedure was performed to prepare polystearate as described in Example 1. The experimental results are summarized in Table 3.

TABLE 3

| Examples | Amount of nonionic detergent (per 100 wt % of bivalent phenol compound) | MW (×10³) | MN (×10³) | Tg (° C.) | Residual Na (ppm) | Degree of light transparency (%) |
|---|---|---|---|---|---|---|
| Example 11 | 0.3 | 119 | 65 | 209 | 5 | 92 |
| Example 12 | 0.63 | 146 | 80 | 211 | 8 | 91 |
| Example 13 | 1.6 | 158 | 87 | 212 | 11 | 90.5 |
| Example 14 | 3.15 | 131 | 75 | 204 | 5 | 89 |
| Example 15 | 6.3 | 103 | 60 | 203 | 9 | 88.5 |

EXAMPLES 16~20

The amounts of KOMUL-NP-4® (structure: polyoxyethylene sorbitan tristearate, HLB: 8.9) 5 wt % solution were adjusted as depicted in Table 4, instead of EMULGEN 120®. The same procedure was performed to prepare polyarylate as described in Example 1. The experimental results are summarized in Table 4.

TABLE 4

| Examples | Amount of nonionic detergent (per 100 wt % of bivalent phenol compound) | MW (×10³) | MN (×10³) | Tg (° C.) | Residual Na (ppm) | Degree of light transparency (%) |
|---|---|---|---|---|---|---|
| Example 16 | 0.3 | 190 | 95 | 212 | 5 | 92 |
| Example 17 | 0.63 | 137 | 73 | 212 | 4 | 90 |
| Example 18 | 1.6 | 149 | 77 | 211 | 5 | 91 |
| Example 19 | 3.15 | 112 | 66 | 202 | 3 | 91.2 |
| Example 20 | 6.3 | 174 | 79 | 203 | 9 | 90.5 |

EXAMPLE 21

4.93 g of 4,4-dihydroxyphenyl-9,9-fluorene, 1.07 g of 2,2-bis(4-hydroxyphenyl)propane, 38.9 g of distilled water, 1.57 g of NaOH and 15 g of 1,4-dioxane were added in a reactor installed with a stirrer, heated and stirred to dissolve the monomers. Then, after the reactor was set up decreasingly at 20° C., 0.378 g of EMULGEN 120® (structure: polyoxyethylene lauryl ether, HLB: 15.3) 5 wt % solution and 3.9 g of methylene chloride were added and stirred vigorously. Separately, 3.8 g of equal quantity of isophthalic acid chloride and terephthalic acid chloride was dissolved in 40 g of methylene chloride. The resulting solution was added to the alkaline solution prepared previously. After proceeding the polymerization for 2 hours, the reaction was stopped by adding acetic acid and then, washed out several times by using one-fold volume of methylene chloride and two-fold volume of distilled water. The resulting organic phase was washed repeatedly until the electric conductivity reached less than 50 μs/cm and poured into methanol to precipitate polymers.

EXAMPLES 22~26

The same procedure of polymerization was performed as described in Example 21, but the amounts of EMULGEN 120® 5 wt % solution were adjusted as illustrated in Table 5. The experimental results of Example 21~26 are summarized in Table 5.

TABLE 5

| Examples | Amount of nonionic detergent (per 100 wt % of bivalent phenol compound) | MW (×10³) | MN (×10³) | Tg (° C.) | Degree of light transparency (%) | Residual Na (ppm) |
|---|---|---|---|---|---|---|
| Example 21 | 0.3 | 148 | 77 | 212 | 91 | 5 |
| Example 22 | 0.63 | 145 | 77 | 213 | 90 | 6 |

TABLE 5-continued

| Examples | Amount of nonionic detergent (per 100 wt % of bivalent phenol compound) | MW (×10³) | MN (×10³) | Tg (° C.) | Degree of light transparency (%) | Residual Na (ppm) |
|---|---|---|---|---|---|---|
| Example 23 | 1.6 | 70 | 40 | 205 | 88 | 8 |
| Example 24 | 3.15 | 82 | 47 | 204 | 89 | 8 |
| Example 25 | 6.3 | 38 | 21 | 198 | 89 | 7 |
| Example 26 | 12.6 | 67 | 36 | 197 | 87 | 9 |

EXAMPLES 27~32

The amounts of EMULGEN 123P® (structure: polyoxyethylene lauryl ether, HLB: 16.9) 5 wt % solution were adjusted as depicted in Table 6, instead of EMULGEN 120®. The same procedure was performed to polymerize polyarylates as described in Example 1. The experimental results are summarized in Table 6.

COMPARATIVE EXAMPLE 1

6.59 g of 4,4-dihydroxyphenyl-9,9-fluorene, 1.37 g of 2,2-bis(4-hydroxyphenyl)propane, 2.1 g of NaOH, 50.4 g of distilled water and 15 g of 1,4-dioxane were added in a reactor installed with a stirrer, heated and stirred to dissolve the monomers. Then, after the reactor was set up decreasingly at 20° C., 0.39 g of benzyltriethylammoniumbromide was added and stirred vigorously. Separately, 5.04 g of equal quantity of isophthalic acid chloride and terephthalic acid chloride was dissolved in 64 g of methylene chloride. The resulting solution was added to the alkaline solution prepared previously. After proceeding the polymerization for 1 hour, the reaction was finished up by adding acetic acid and then, washed out several times by using one-fold volume of methylene chloride and two-fold volume of distilled water. The resulting organic phase was washed repeatedly until the electric conductivity reached less than 50 μs/cm and poured into methanol to precipitate polymers.

As a consequence, the experimental results of Example 27~32 and Comparative Example 1 are summarized in Table 6.

TABLE 6

| Examples | Amount of nonionic detergent (per 100 wt % of bivalent phenol compound) | MW (×10³) | MN (×10³) | Tg (° C.) | Residual Na (ppm) | Degree of light transparency (%) |
|---|---|---|---|---|---|---|
| Example 27 | 0.3 | 145 | 75 | 212 | 4 | 91 |
| Example 28 | 0.63 | 72 | 41 | 208 | 7 | 91 |
| Example 29 | 1.6 | 68 | 42 | 197 | 8 | 89.5 |
| Example 30 | 3.15 | 103 | 56 | 201 | 6 | 90 |
| Example 31 | 6.3 | 24.3 | 13 | 161 | 7 | 91 |
| Example 32 | 12.6 | 50 | 26 | 164 | 10 | 89.6 |
| Comparative Example 1 | | 102 | 52 | 198 | 20 | 83 |

EXAMPLE 33

8.22 g of 4,4-dihydroxyphenyl-9,9-fluorene, 1.78 g of 2,2-bis (4-hydroxyphenyl) propane, 113 g of distilled water, 3.144 g of NaOH and 15 g of 1,4-dioxane were added in a reactor installed with a stirrer, heated and stirred to dissolve the monomers. Then, after the reactor was set up decreasingly at 20° C., 0.228 g of EMULGEN 120® (structure: polyoxyethylene lauryl ether, HLB: 15.3) 5 wt % solution and 11.4 g of methylene chloride were added and stirred vigorously. Separately, 3.8 g of equal quantity of isophthalic acid chloride and terephthalic acid chloride was dissolved in 67.2 g of methylene chloride. The resulting solution was added to the alkaline solution prepared previously. After proceeding the polymerization for 2 hours, the reaction was finished up by adding acetic acid and then, washed out several times by using one-fold volume of methylene chloride and two-fold volume of distilled water. The resulting organic phase was washed repeatedly until the electric conductivity reached less than 50 μs/cm and poured into methanol to precipitate polymers. The experimental results are summarized in Table 7.

EXAMPLES 34~36

The same procedure of polymerization was performed as described in Example 21, but the amounts of EMULGEN 120® 5 wt % solution were adjusted as illustrated in Table 7. The experimental results are summarized in Table 7.

EXAMPLES 37~40

The amounts of EMULGEN 123P® (structure: polyoxyethylene lauryl ether, HLB: 16.9) 5 wt % solution were adjusted as depicted in Table 7, instead of EMULGEN 120®. The same procedure was performed to polymerize polyarylates as described in Example 21. The experimental results are summarized in Table 7.

TABLE 7

| Examples | Amount of nonionic detergent (per 100 wt % of bivalent phenol compound) | MW (×10³) | MN (×10³) | Tg (° C.) | Degree of light transparency (%) |
|---|---|---|---|---|---|
| Example 33 | 0.11 | 46 | 20 | 165 | 91 |
| Example 34 | 0.57 | 68 | 30.6 | 178 | 91 |
| Example 35 | 1.14 | 95 | 50 | 198 | 90 |
| Example 36 | 1.7 | 19 | 4.5 | 154 | 89.5 |
| Example 37 | 0.11 | 75 | 42 | 175 | 91 |
| Example 38 | 0.57 | 73 | 39 | 174 | 90.5 |
| Example 39 | 1.14 | 70 | 36 | 175 | 91 |
| Example 40 | 1.7 | 52 | 17 | 175 | 88.9 |

As described in Examples, nonionic surface-active agents are utilized to prepare polyarylates having a broad range of molecular weights in the process of the present invention. It is identified that the polyarylates prepared above have the excellent transmittance in about 90% and the good heat-resistance, since they include little residual salts in less than 10 ppm. However, it is observed that the polyarylate prepared by using benzyltriethylammoniumbromide as a phase transitional catalyst in Comparative Example 1 includes residual salts a lot in above 20 ppm and has the bad transmittance in about 83%.

INDUSTRIAL APPLICABILITY

As illustrated and confirmed above, the polyarylates that has less residual salts so as to improve the transmittance and the heat-resistance can be obtained by using a nonionic surface-active agent in the present invention.

Those skilled in the art will appreciate that the conceptions and specific embodiments disclosed in the foregoing description may be readily utilized as a basis for modifying or designing other embodiments for carrying out the same purposes of the present invention.

Those skilled in the art will also appreciate that such equivalent embodiments do not depart from the spirit and scope of the invention as set forth in the appended claims.

The invention claimed is:

1. A process for preparing polyarylate, by reacting an alkaline aqueous solution of a bivalent phenol monomer having the structure of Formula 1 in contact with a solution of an aromatic dicarboxylic acid halogen compound in a hydrophobic organic solvent in the presence of a nonionic surfactant having 4~20 of HLB,

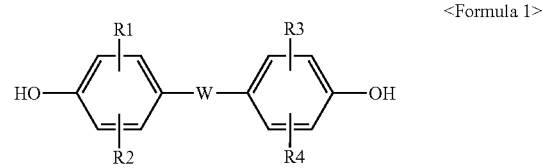

<Formula 1> wherein, R1, R2, R3 and R4 are hydrogen, $C_1$~$C_{12}$ alkyl, aryl or halogen independently; W is $C_1$~$C_{30}$ alkylidene, $C_2$~$C_{30}$ alkylene, $C_3$~$C_{30}$ cycloalkylidene, $C_3$~$C_{30}$ cycloalkene, $C_2$~$C_{30}$ alkylene substituted for phenyl, oxygen, sulfur, sulfoxide, sulfone or single bond.

2. The process for preparing polyarylate according to claim 1, wherein the nonionic surfactant is at least one selected from a group comprising polyoxy ethylene lauryl ether, polyoxyethylene nonylphenyl ether, octylphenoxy polyethoxy ethanol, polyoxyethylene-polyoxypropylene block copolymer, sorbitol anhydride, ethoxylated fatty acid alcohol, ethoxylated fatty acid, ethoxylated alkyl phenol, alkanolamide (fatty acid alkanolamide), ethoxylated fatty acid alkanolamide, fatty acid amine oxide, fatty acid amido amine oxide, glyceryl fatty acid ester, sorbitan, polyoxyethylene sorbitan tristearate, ethoxylated sorbitan ester, alkyl polyglycoside, ethylene/propylene oxide block copolymer, and ethoxylated-propoxylated fatty acid alcohol.

3. The process for preparing polyarylate according to claim 1, wherein the nonionic surface-active agent is added in 0.05~20 wt % per 100 wt % of a bivalent phenol compound.

4. The process for preparing polyarylate according to claim 1, wherein the bivalent phenol compound can be at least one selected from the group comprising bis(4-hydroxyphenyl) methane, 2,2-bis(4-hydroxyphenyl)propane, 1,1-bis(4-hydroxyphenyl)ethane, 2,2-bis(4-hydroxy-3-methylphenyl) propane, 2,2-bis(4-hydroxyphenyl)heptane, 2,2-bis(4-hydroxy-3,5-dichlorophenyl)propane, 2,2-bis(4-hydroxy-2,5-dibromophenyl)propane, bis(4-hydroxyphenyl) phenylmethane, 4,4-dihydroxyphenyl-1,1-m-diisopropylbenzene, 4,4-dihydroxyphenyl-9,9-fluorene, 1,1-bis(4,4-dihydroxyphenyl)cyclopentane, 1,1-bis(4,4-dihydroxyphenyl)cyclohexane, 1-methyl-1(4- hydroxyphenyl)-4-(dimethyl-4-hydroxyphenyl)methylcyclohexane, 4-{1-[3-(4-hydroxyphenyl)-4-methylcyclohexyl]-1-methylethyl}phenol, 4,4-[1-methyl-4-(1-methylethyl)-1,3-cyclohexanediyl]bisphenol, 2,2,2,2-tetrahydro-3,3,3,3-tetramethyl-1,1-spirobis-[1H]-ynedene]-6,6-diol, bis(4-hydroxyphenyl)ether, bis(4-hydroxy-3,5-dichlorophenyl)ether, 4,4-dihydroxy-3,3-dimethyiphenylether, 4,4-dihydroxydiphenylsulfide, 4,4-dihydoxy-3,3-dimethyldiphenylsulfide, 4,4-dihydroxydiphenylsulfoxide, 4,4-dihydroxy-3,3-dimethyldiphenylsulfoxide, 4,4-dihydroxydiphenylsulfone, 4,4-dihydroxy-3,3-dimethyldiphenylsulfone, 4,4-dihydoxydiphenyl-3,3-isatine, resocine, 3-methylresocine, 3-ethylresocine, 3-butylresocine, 3-t-butylresocine, 3-phenylresocine, 3-cumylresocine, 4,4'-dihydroxydiphenyl, and 3,3'-dichloro-4,4'-dihydroxydiphenyl.

5. The process for preparing polyarylate according to claim 1, wherein the aromatic dicarboxylic acid can be at least one selected from the group comprising terephthalic acid, isophthalic acid, dibenzo acid, naphthalene dicarboxylic acid, bis(4-carboxyphenyl)methane, 1,2-bis(4-carboxyphenyl)ethane, 2,2-bis(4-carboxyphenyl)propane, bis(4-carboxyphenyl)oxide, bis(4-carboxyphenyl)sulfide, bis(4-carboxyphenyl)sulfone and other aromatic dicarboxylic acids substituted for the aromatic group of above compounds by $C_1$~$C_2$ alkyl or halogen.

* * * * *